Patented Aug. 16, 1932

1,871,990

UNITED STATES PATENT OFFICE

FRANZ HENLE AND VALENTIN LANZ, OF HOCHST-ON-MAIN, GERMANY, ASSIGNORS TO GENERAL ANILINE WORKS, INC., OF NEW YORK, N. Y., A CORPORATION OF DELAWARE

PROCESS OF PREPARING 2.3-AMINONAPHTHOIC ACID

No Drawing. Application filed February 3, 1928, Serial No. 251,735, and in Germany February 7, 1927.

According to the process described by Möhlau in "Berichte der Deutschen Chemischen Gesellschaft" volume 28, page 3096, 2.3-aminonaphthoic acid of the formula

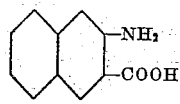

is prepared by subjecting 2.3-hydroxynaphthoic acid in a high-pressure autoclave with ammonia to a pressure of about 100 atmospheres. Over this process the zinc chloride-ammonia melting process according to Fierz-Tobler (cf. Helv. Chim. Acta 1922, volume V, page 557) has the advantage that it permits working in open vessels and obtaining better yields of 2.3-aminonaphthoic acid.

According to the process of Fierz-Tobler, one part of ammonium chloride is added to a mixture of one part of 2.3-hydroxynaphthoic acid and one part of zinc chloride-ammonia. As further investigations have proved, the purpose of this ammonium chloride addition can only be to render the mixture more crumbly so that it can easily be stirred because, when using equal parts of 2.3-hydroxynaphthoic acid and zinc chloride-ammonia without any addition of ammonium chloride, a mass consisting of hard lumps is formed even at a temperature 20° C. below that of the reaction, so that even the stirrer of a melting vessel of the strongest type used in practice cannot operate. The addition of ammonium chloride is, however, detrimental because a technical regeneration of the zinc chloride-ammonia is thereby rendered impossible in that it prevents the precipitation of the zinc from the zinc-containing solution encountered in the regenerating process.

Now we have found that by using the molten zinc chloride-ammonia as a solvent in the melting operation and without the addition of ammonium chloride and only moderately increasing the quantity of zinc chloride-ammonia used, there is obtained a melt which easily can be stirred with ordinary stirrers. The comparatively smallest quantity of zinc chloride-ammonia will be sufficient, if the zinc chloride-ammonia is used in a molten state and the 2.3-hydroxynaphthoic acid is introduced by portions. It is also possible to proceed inversely, by introducing, while stirring, molten zinc chloride-ammonia into molten 2.3-hydroxy-naphthoic acid maintained at from 215° C. to 220° C.

It is advantageous to use in our new process a zinc chloride-ammonia of the constitution $ZnCl_2NH_3$ into which the zinc chloride-ammonia compounds of every kind are gradually transformed when heated and which can, for instance, also be obtained by introducing ammonia into molten zinc chloride.

Our invention involves the further advantage that the transformation into 2.3-aminonaphthoic acid can be completed within 10 to 12 hours, i. e. a third of the time required by Fierz.

The yield of pure aminonaphthoic acid obtainable by our new process is at least as good as that according to the process described by Fierz.

We have furthermore found that the product extracted in the zinc chloride-ammonia melting process with hydrochloric acid either according to the method described by Fierz or according to the process of our present invention, does not constitute the pure hydrochloride of 2.3-aminonaphthoic acid as stated by Fierz, but contains only a small admixture thereof. The greater part of the 2.3-aminonaphthoic acid is, however, present in a disguised form, perhaps as an inner salt or an amide. Only by boiling with sodium carbonate or with a caustic alkali solution can the 2.3-aminonaphthoic acid be obtained from the supposed hydrochloride which is insoluble in cold sodium carbonate, whereas the real hydrochloride of 2.3-aminonaphthoic acid is very readily soluble even in dilute cold sodium carbonate solution. The real hydrochloride of 2.3-aminonaphthoic acid furthermore differs from the supposed hydrochloride in that the real, absolutely white and pure hydrochloride hydrolizes in water immediately into yellow amino-naphthoic acid, whereas the supposed hydrochloride is brownish-red and does not react with cold water.

The following examples serve to illustrate our invention, the parts being by weight:

1. 2 parts of zinc chloride-ammonia of the formula $ZnCl_2NH_3$ are heated in a melting vessel provided with a stirrer and scraper. Between 180° C. and 190° C. a thin-liquid melt is obtained, into which there is gradually introduced 1 part of dry 2.3-hydroxynaphthoic acid. The whole is then stirred at from 240° C. to 250° C. for 12 hours, advantageously while passing ammonia over it. On cooling the mass becomes powdery and can be further stirred. The zinc chloride is first dissolved out of the reaction product by means of dilute hydrochloric acid and the 2.3-aminonaphthoic acid is then dissolved by repeatedly extracting the product with hot hydrochloric acid of 10 to 12 per cent strength. The hydrochloride filtrate is feebly superneutralized by means of a caustic alkali solution or sodium carbonate, heated to boiling, filtered cold and acidified until there is an acid reaction towards litmus. Thus the 2.3-aminonaphthoic acid is precipitated with a yield of more than 70 per cent of the theory.

2. 50 parts of 2.3-hydroxynaphthoic acid are melted in an iron vessel provided with a stirrer at from 215° C. to 220° C. There are then added thereto 120 parts of molten zinc chloride ammonia at a temperature of 200° C. The whole is heated to 240° C. for 10 hours, whereupon the product of the reaction is worked up in the manner indicated in the preceding example. The yield of 2.3-aminonaphthoic acid amounts to about 70 per cent. of the theory.

We claim:

1. In a process of preparing 2.3-aminonaphthoic acid, the step which consists in causing dry 2.3-hydroxynaphthoic acid to react with a molten zinc chloride-ammonia at atmospheric pressure.

2. In a process of preparing 2.3-aminonaphthoic acid, the step which consists in causing dry 2.3-hydroxynaphthoic acid to react with a small excess of molten zinc chloride-ammonia of the formula $ZnCl_2NH_3$ at atmospheric pressure.

3. Process of preparing 2.3-aminonaphthoic acid which comprises gradually introducing 1 part of dry 2.3-hydroxynaphthoic acid into a melt of 2 parts of zinc chloride-ammonia maintained at about from 180° C. to 190° C. under agitation, raising the temperature of the mixture to about from 240° C. to 250° C. at atmospheric pressure and maintaining said temperature while agitating the mixture and providing an atmosphere of ammonia by passing ammonia over it until the transformation of the 2.3-hydroxynaphthoic acid into the 2.3-aminonaphthoic acid is substantially complete.

4. The process of preparing 2.3-aminonaphthoic acid which comprises causing dry 2.3-hydroxynaphthoic acid to react at a temperature of between about 240° C. and 250° C. and at atmospheric pressure with a small excess of molten zinc chloride-ammonia of the formula $ZnCl_2NH_3$, and transforming the product of the reaction, after having eliminated the zinc chloride therefrom, into 2.3-aminonaphthoic acid by treating it with hot hydrochloric acid of from 10-12% strength, superneutralizing the hot hydrochloric acid extract with an alkaline agent, heating the mass to boiling, filtering it cold and acidifying it.

5. The process of preparing 2.3-aminonaphthoic acid which comprises heating two parts of zinc chloride-ammonia of the formula $ZnCl_2NH_3$ while stirring, introducing into the thin liquid melt thus obtained at between about 180° C. and 190° C. one part of dry 2.3-hydroxynaphthoic acid, stirring the whole mass at between about 240° C. and 250° C. and at atmospheric pressure, eliminating from the cooled reaction product the zinc chloride by means of dilute hydrochloric acid, treating the product so obtained with hot hydrochloric acid of from 10-12% strength, superneutralizing the hot hydrochloric acid extract with a caustic alkali solution, heating the mass to boiling, filtering it cold and acidifying it.

In testimony whereof, we affix our signatures.

Dr. FRANZ HENLE.
Dr. VALENTIN LANZ.